United States Patent [19]

Chen

[11] Patent Number: 5,260,371
[45] Date of Patent: Nov. 9, 1993

[54] PROCESS FOR MAKING MELT STABLE ETHYLENE VINYL ALCOHOL POLYMER COMPOSITIONS

[75] Inventor: John C. Chen, Hockessin, Del.

[73] Assignee: E. I. Du Pont de Nemours and Company, Wilmington, Del.

[21] Appl. No.: 934,225

[22] Filed: Aug. 25, 1992

Related U.S. Application Data

[63] Continuation-in-part of Ser. No. 734,768, Jul. 23, 1991, abandoned.

[51] Int. Cl.$^5$ .................. C08F 216/06; C08K 5/09; C08K 3/20; C08K 5/13
[52] U.S. Cl. .................. 525/60; 525/57; 525/79; 524/291; 524/394; 524/430; 524/503
[58] Field of Search ............ 524/291, 394, 399, 400, 524/425, 430, 503; 525/57, 60, 79

[56] References Cited

U.S. PATENT DOCUMENTS 4,600,746 7/1986 Schmukler et al. .................. 525/57
4,877,662 10/1989 Yazaki et al. ...................... 428/36.7
5,032,632 7/1991 Saxton .............................. 524/291

OTHER PUBLICATIONS

U.S. Pat. Appl'n. Ser. No. 07/523,544; filed May 15, 1990 (Saxton).

Primary Examiner—Paul R. Michl
Assistant Examiner—Tae H. Yoon

[57] ABSTRACT

The present invention relates generally to toughened ethylene vinyl alcohol ("EVOH") compositions having improved melt processing stability. More specifically, the EVOH compositions comprise anhydride-modified polyolefin toughening resin and a stabilizer system comprising a basic inorganic compound. In the preferred embodiment, the toughening resin and basic inorganic compound are melt blended in a first step and later melt blended with the EVOH composition in a second step.

1 Claim, 1 Drawing Sheet

PROCESS FOR MAKING MELT STABLE ETHYLENE VINYL ALCOHOL POLYMER COMPOSITIONS

CROSS REFERENCE TO RELATED APPLICATIONS

This is a continuation-in-part to application Ser. No. 07/734,768 filed Jul. 23, 1991 now abandoned.

FIELD OF THE INVENTION

The present invention relates generally to toughened ethylene vinyl alcohol ("EVOH") compositions having improved melt processing stability. More specifically, the EVOH compositions of the present invention comprise anhydride-modified polyolefin toughening resin and a stabilizer system comprising a basic inorganic compound and a fatty acid salt.

BACKGROUND OF THE INVENTION

U.S. Pat. No. 5,032,632 to Saxton (hereafter "SAXTON") discloses EVOH copolymer material having substantial viscosity stability during melt processing due to the incorporation of the following additives:
(a) metal salt of an aliphatic carboxylic acid having 3 to 9 carbon atoms; and
(b) hindered phenolic antioxidant.
Applicant has found a way to toughen the compositions of SAXTON, while maintaining viscosity stability during melt processing.

SUMMARY OF THE INVENTION

The present invention involves toughening the EVOH compositions of SAXTON by melt blending anhydride-functionalized polyolefin (together with a stabilizer system) into the SAXTON composition. The polyolefin's anhydride functional groups presumably react with the EVOH hydroxyl groups, thereby compatibalizing the polyolefin with the EVOH. Unfortunately, this reaction tends to promote viscosity instability despite the presence of the stabilizer system taught in SAXTON. Applicant has solved this problem by incorporating (in addition to the stabilizer system of SAXTON) at least one basic inorganic compound into the final composition.

The compositions of the present invention are preferably produced in a multi-step process, most preferably, a two-step process. In the preferred first step, the following components are melt blended:
1. anhydride functionalized polyolefin; and
2. basic inorganic compound.
In the preferred second step, the melt blended composition of step 1 is melt blended with the following:
1. EVOH copolymer;
2. metal salt of aliphatic carboxylic acid having 3 to 9 carbon atoms (also hereafter referred to as "C3–C9 stabilizer"); and
3. hindered phenolic antioxidant.
The present invention comprises the following critical components:
1. EVOH polymer (base resin);
2. anhydride functionalized polyolefin (resin toughener);
3. basic inorganic compound (viscosity stabilizer to counteract any viscosity instability due to interaction between the EVOH and anhydride functionalized polyolefin resin toughener);
4. metal salt of aliphatic carboxylic acid having 3 to 9 carbon atoms (also hereafter referred to as "C3–C9 STABILIZER"; this is part of the EVOH stabilizer system of SAXTON);
5. hindered phenolic antioxidant (part of the EVOH stabilizer system of SAXTON).
Each of the above components will now be discussed in detail.

The EVOH Component

The EVOH component of the present invention is preferably synthesized by copolymerizing about 20 to 60 mole percent (more preferably about 25 to 50 mole percent) ethylene with about 40 to 80 mole percent (more preferably 50 to 75 mole percent) vinyl acetate followed by hydrolysis or alcoholysis. EVOH derived from copolymers of greater than about 80 mole percent vinyl acetate tend to be difficult to extrude, while those having less than about 40 mole percent vinyl acetate generally do not provide good barrier properties.

The ethylene/vinyl acetate copolymer is hydrolyzed or alcoholized in the present of a catalyst, such as sodium methoxide or sodium hydroxide, until the desired amount of conversion (saponification) to ethylene vinyl alcohol polymer is achieved. The preferred EVOH copolymers of the present invention will have undergone saponification to a degree of at least about 90 mole percent, more preferably at least about 95 mole percent, and most preferably at least about 98 mole percent.

The EVOH may also include optional comonomer, such as, propylene, butene-1, pentene-1, or 4-methylpentene-1 in such small amounts as to not change the inherent properties of the copolymer—generally up to about 5 mole % based on the total copolymer. The EVOH melting point is preferably in the range of about 150° C. and 190° C. The EVOH melt flow index will generally be about 0.5 to 30 g/10 min. at 210° C. using a 2160 g weight.

Anhydride Modified Polyolefin

"Anhydride modified polyolefin" is intended to mean polyolefin polymer having carboxylic acid anhydride functionality. The anhydride modified polyolefins are used to toughen the final composition of the present invention.

Most polyolefins are generally tougher than EVOH, and these polyolefins therefore are the most preferred. Most commercially available, non-modified polyolefins are generally not compatible with EVOH, and due to this incompatibility, a blend of EVOH and unmodified polyolefin will generally provide a product with a toughness which is less than the polyolefin and exert little toughness improvement for EVOH.

To improve compatibility and thereby improve the toughness of the final composition, the polyolefin must be functionalized with an anhydride. When the polyolefin is polypropylene, this functionality is generally obtained by grafting the anhydride-containing component onto the polypropylene. When the polyolefin is ethylene, this functionality may be provided by copolymerization or grafting. The anhydride modified polyolefin copolymer of the present invention has been found to be an excellent EVOH toughener.

Suitable polyolefins (from which anhydride-modified polyolefins can be derived) include ethylene and propylene homopolymers and copolymers. Suitable ethylene polymers include linear low density polyethylene ("LLDPE"), low density polyethylene ("LDPE"), medium density polyethylene ("MDPE") and high density polyethylene ("HDPE")

Examples of ethylene copolymers include ethylene/n-butyl acrylate copolymer, ethylene/ethyl acrylate copolymer, ethylene/n-butyl acrylate/carbon monoxide terpolymer, ethylene/vinyl acetate copolymer, ethylene-styrene/butene-styrene block copolymer.

Suitable polypropylene polymers include homopolymer, propylene/ethylene copolymers and EPDM copolymers having a diene comonomer content of about 2 to 6 wt %. Examples of such copolymers include ethylene/propylene/diene such as 1,4-hexadiene. The most preferred polypropylene polymers and copolymers of the present invention have a melt flow index of about 0.5 to 50 g/10 min at 190° C. using 2160 g weight.

The most preferred modified polyolefin polymers are ethylene polymers derived from:

(a) about 40 to about 79 wt % ethylene comonomer,
(b) about 0.5 to about 30 wt % carbon monoxide or sulfur dioxide,
(c) about 20 to about 50 wt % unsaturated carboxylic acids or unsaturated derivatives of carboxylic acids other than anhydrides, and
(d) about 0.01 to about 5 wt % of at least one comonomer containing pendant carboxylic acid anhydride functionality.

Component (b) involves CO or $SO_2$ which is believed to increase copolymer polarity, thereby increasing the level of compatibility with the EVOH copolymer. This increased compatibility improves toughening. Component (b)'s upper limit is not clearly defined but should be present in an amount at least sufficient to lead to such improvement (30 wt % is considered to be a practical limit for copolymerizing such a comonomer). Preferably this comonomer is carbon monoxide, and is present in an amount of about 7–25 wt %, more preferably about 8 to about 15 wt %, and most preferably about 10 to about 14 wt %.

Component (c), the unsaturated acid (or derivative thereof), is preferably an unsaturated mono- or dicarboxylic acid having 3–18 carbon atoms, alkyl ester of such acids having 1–18 carbon atoms in the alkyl group, unsaturated alkyl nitrile having 3–18 carbon atoms, vinyl esters of saturated carboxylic acids where the acid group has 3–18 carbon atoms, and alkyl vinyl ethers where the alkyl group has 1–18 carbon atoms. Suitable such comonomers include acrylic acid, methacrylic acid, vinyl acetate, alkyl acrylates and methacrylates having alkyl groups such as methyl, ethyl, propyl, isopropyl, n-butyl, isobutyl, t-butyl, n-pentyl, n-hexyl, 2-ethylhexyl, and the like, propyl vinyl ether, acrylonitrile, and methacrylonitrile.

Preferred comonomers are alkyl acrylates and methacrylates, in particular is n-butyl acrylate. The comonomer preferably comprises about 25 to about 45 wt % (more preferably about 27 to about 40 wt %, and most preferably about 28 to about 30 wt %) of the copolymer's main chain of the copolymer.

Component (d) is at least one comonomer containing pendant carboxylic acid anhydride functionality. This comonomer can be incorporated into the polymer chain itself by well-known radical initiated polymerization processes, although more preferably this comonomer is grafted onto the main chain. The grafting monomer is preferably ethylenically unsaturated di-, or polycarboxylic acid anhydrides and ethylenically unsaturated carboxylic acid anhydrides. Examples of suitable anhydrides include itaconic anhydride, maleic anhydride, and dimethyl maleic anhydride. Maleic anhydride (which may also be prepared from fumaric acid) is preferred. These grafting monomers can also be used to provide this functionality to polypropylene as the polyolefin.

The grafting method for the anhydride comonomer can be any conventional process known in the art. For example, grafting accomplished in the melt without a solvent, or in a solution or dispersion. Melt grafting can be done using a heated extruder, a Brabender or Banbury mixer or other internal mixers or kneading machines, roll mills, and the like. The grafting may be carried out thermally or in the presence of a radical initiator such as a suitable organic peroxide, organic perester, or organic hydroperoxide, or thermally.

The graft polymers can be recovered by any method which separates or utilizes the graft polymer that is formed. Thus the graft polymer can be recovered in the form of precipitated fluff, pellets, powders, and the like.

The amount of monomer grafted onto the ethylene copolymer is not particularly limiting, and may be as low as about 0.01 wt % or as much as about 5 percent, based on the weight of the grafted ethylene copolymer. Preferably the amount of graft comonomer is 0.05 to about 1.5 percent of the polyolefin, and more preferably about 0.1 to about 0.5 percent.

Ungrafted polymer can also be present. Sometimes anhydride grafted polymer compositions comprise a certain fraction which is not grafted due to process limitations or the like. This is not a problem, provided the overall amount of pendant anhydride functionality in the composition remains sufficiently high to provide the desired improvements.

The anhydride-modified copolymer presumably reacts and bonds to the EVOH, thereby providing compatibalization between the polyolefin and the EVOH, which in turn, provides toughness to the final composition. Generally, this result can be achieved with the presence of about 1 to 49 weight parts anhydride modified polyolefin, more preferably about 10–25 weight parts (and about 51 to 99 weight parts EVOH, more preferably about 75 to 90 weight parts EVOH) per 100 weight parts EVOH and anhydride-modified polyolefin.

Basic Organic Compound Stabilizer

When incorporating the anhydride-modified polyolefin into the EVOH, melt viscosity instability generally occurs over extended processing steps. This presumably is due to unwanted gelation, although other unwanted reactions might also be partially or wholly responsible. Gelation may not be visible until the resultant blend is melt fabricated in articles.

To prevent such viscosity instability, a basic inorganic compound, preferably a metal oxide and/or salt, is also incorporated into the melt blend in an effective amount to counteract the viscosity instability reaction(s). Examples of suitable such compounds include CaO, $CaCO_3$, MgO, $MgCO_3$, ZnO and $ZnCO_3$ and mixtures thereof.

What is evident is that gelation essentially is not visible in the articles fabricated from the melt blend when a basic inorganic compound is used. Rather than the identity of any particular basic inorganic compound, the inorganic compound's basicity at the melt processing condition is critical to achieve the result of counteracting the gel formation. A wide variety of basic inorganic compounds can be used in the present invention.

Weak bases such as Ca stearate and Ca octanoate are generally ineffective to prevent the gelation from occurring when the anhydride-modified polyolefin is incorporated into the melt blend. However, the basicity and concentration of the inorganic oxides and salts should be adjusted so that the time of thermal process will not significantly degrade the EVOH.

The amount of basic inorganic compound used in accordance with the present invention will be that which is effective to counteract the gelation and will depend on the particular compound used and the amount of anhydride functionally present in the melt blend. Typically, the amount of basic inorganic compound will be about 0.05 to 5 wt % based on the total of EVOH and anhydride-modified polyolefin.

Hindered Phenolic Antioxidant

The hindered phenolic antioxidant is part of the SAXTON stabilizer system and can be one or more of a well known class of antioxidants generally used to combat oxidative degradation during thermal processing of the EVOH. Such antioxidants are characterized by a phenol group with sterically bulky substituents located ortho to the OH functionality. Such antioxidants are well-known and are sold under a variety of trade names. Suitable antioxidants include 4,4'-thiobis(6-t-butyl-m-cresol), 1,3,5-trimethyl-2,4,6-tris(3,5-t-butyl-5-hydroxybenzyl)benzene, tetrakis(methylene(3,5-di-t-butyl-4-hydroxyhydrocinnamate)methane, octadecyl-3,5-di-t-butyl-4-hydroxyhydrocinnamate, N,N'-hexamethylene-bis(3,5-di-t-butyl-4-hydroxyhydrocinnam-amide), N,N'-trimethylene-bis(3,5-di-t-butyl-4-hydroxyhydro-cinnamamide), and hexamethylene-bis(6-t-butyl-m-cresol).

The amount of hindered phenolic antioxidant will generally be about 0.01 to about 0.5 wt %, preferably about 0.04 to about 0.4 wt %, based on the total amount of EVOH and anhydride-modified polyolefin present.

C3–C9 STABILIZER

Another important stabilizer is a metal salt of an aliphatic carboxylic acid having 3 to 9 carbon atoms ("C3–C9 STABILIZER"). This stabilizer is used to combat EVOH thermal degradation during thermal processing. Preferably, the metal is monovalent or divalent. Suitable metals include calcium, zinc, magnesium, lead, manganese, tin, sodium, and potassium. Calcium, magnesium, and zinc are preferred, and calcium is particularly preferred.

C3–C9 STABILIZERS are preferably saturated, unsubstituted monocarboxylic acids and include propionic acid, n-butyric acid, isobutyric acid, n-pentanoic acid, n-hexanoic acid, n-heptanoic acid, n-octanoic acid, 2-ethylhexanoic acid, n-nonanoic acid, and isomers thereof. The salts of acetic acid having two carbon atoms are generally not useful in the present invention, and the salts of acids having greater than 9 carbon atoms are generally progressively less useful.

In addition to salts of a single acid, mixtures of a variety of such acids may be commercially available, and would be suitable. The preferred acids are those of 3 to 8 and especially 4 to 8 carbon atoms. In terms of cost and effectiveness, calcium octanoate is a specially preferred salt. Mixtures of salts of acids of different molecular weights can also be employed.

The amount of the above-described salt will generally be about 0.005 to about 0.5 weight parts per hundred weight parts of the total amount of EVOH and anhydride-modified polyolefin. The preferred amount will depend to some extent on the identity and molecular weight of the acid component of the salt.

The amount of the hindered phenol antioxidant and C3–C9 STABILIZER as described above should be in any event be present in an effective amount to provide viscosity stability under the conditions of melt processing employed. Such viscosity instability, if it occurred, would cause the viscosity of the EVOH to increase during melt processing, leading to gelation of the EVOH. In effect, therefore the antioxidant and C3–C9 STABILIZER provide melt viscosity stabilization to the molten EVOH. Excessive amount of C3–C9 STABILIZER can cause degradation of the EVOH, manifested by decreasing melt viscosity.

Optional Additives

A salt of a higher fatty acid can also be present to supplement the above-described stabilizer combination. The higher fatty acid can be any of those having about 14 to about 22 carbon atoms, and the neutralizing metal ion can be any of those listed above. The amount of such salt is preferably 0.01 to 0.5 wt parts per hundred weight parts EVOH and anhydride-modified polyolefin. In particular, a small amount of a stearate (particularly calcium stearate) can provide enhanced results. The higher fatty acid salt is in addition to the C3–C9 STABILIZER, which is essential to the composition, and the higher fatty acid salt is NOT a substitute for the C3–C9 STABILIZER.

Additional additives, fillers, and the like can be added for their ordinary functions, so long as they do not interfere with the functioning of the present invention. Such additives can include glass fiber or microspheres, talc, clay, mica, lubricants (e.g. ethylene bis-stearamide, polyethylene waxes, ionomer waxes) and pigments. Other polymers may also be added to the melt blend to impart their properties to the melt fabricated product.

Melt Blending

The basic inorganic compound can be blended with the polymer feeds into the thermal processing operation, whether this be melt compounding or melt fabrication. Preferably, however, at least some, and more preferably all, of the basic inorganic compound is incorporated into the melt blend by pre-incorporation into the anhydride-modified polyolefin.

The pre-blended, modified-polyolefin and basic inorganic compound is finely dispersed and melt blended into the EVOH, by stirring, agitation, mixing, or the like. The interface (between the molten anhydride-modified polyolefin and the molten EVOH) is stabilized by the basicity of the basic inorganic compound, thereby counteracting gelation; otherwise, excessive side reactions between anhydride groups and OH groups can create unwanted crosslinking or gelation. The basic inorganic compound is efficiently made available at the interface as the anhydride-modified polyolefin is divided into smaller and smaller molten particles by the mixing action applied to the melt blend. In this way, the basic inorganic compound is slowly released into the EVOH molten matrix in the precise region where the gelation is prone to occur, thereby counteracting gelation during the entire duration of melt blending and the subsequent melt processing/fabrication.

This counteraction (viscosity stabilization) is also present when molding granules of the melt blend from melt compounding is re-melted in the course of melt fabrication, such as by injection molding or extrusion. Alternatively, the melt compounding and melt-fabrication can be carried out in a single thermal processing operation, with the basic inorganic compound counteracting the formation of any appreciable gelation. The metering of the basic inorganic compound into the EVOH via the surface of the dispersed phase of anhydride-modified polyolefin in the EVOH also tends to protect the EVOH from being degraded severely by the compound during the time of thermal processing required.

Final Compositions

The compositions of the present invention are useful in providing tough oxygen and/or flavor barrier layers in coextruded plastic structures, e.g., multilayer sheets and thermoformed containers therefrom, multilayer films, pipes, tubes, and blow-molded articles, and in multilayer structures formed by injection molding, colamination, or by extrusion coating.

DETAILED DESCRIPTION OF THE PREFERRED EMBODIMENT

Figure 1:
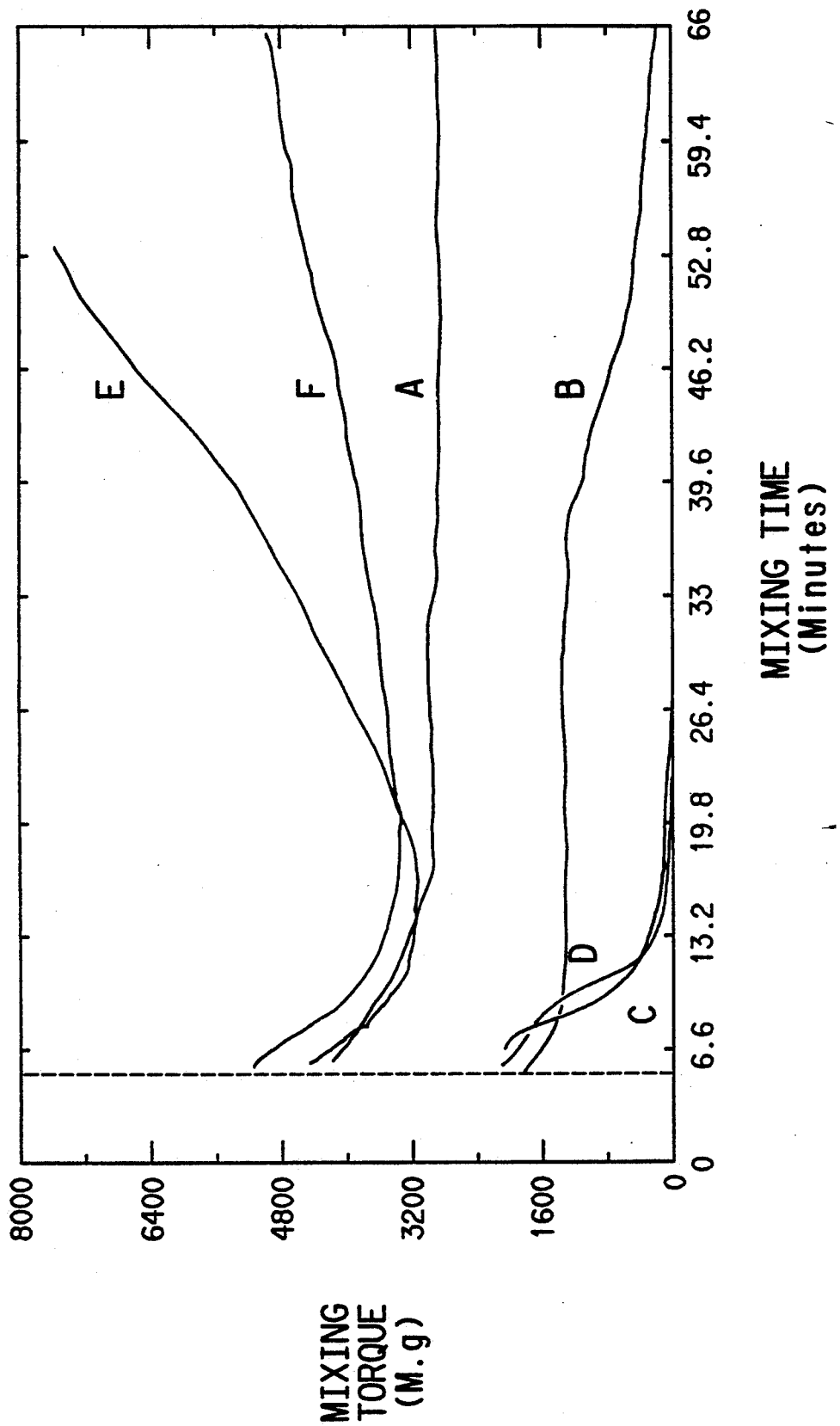
FIG. 1 is a plot of mixing torque versus mixing time for six EVOH copolymer blend compositions.

The present invention involves toughening EVOH compositions by melt blending anhydride-functionalized polyolefin (together with a basic inorganic stabilizer system) into the EVOH composition in a multi-step mixing process. In the preferred first step, the following components are melt blended using conventional melt blending equipment:
1. anhydride functionalized polyolefin; and
2. basic inorganic compound.

In the preferred second step, the melt blended composition of step 1 is melt blended with the following:
1. ethylene vinyl alcohol copolymer;
2. metal salt of aliphatic carboxylic acid having 3 to 9 carbon atoms (also hereafter referred to as "C3–C9 stabilizer"); and
3. hindered phenolic antioxidant.

The EVOH component is preferably synthesized by copolymerizing about 25 to 50 mole percent ethylene with about 50 to 75 mole percent vinyl acetate and hydrolyzing or alcoholizing the resulting copolymer to preferably achieve at least about 98 mole percent conversion. The EVOH may include conventionally known EVOH comonomers. The EVOH melting point is preferably in the range of about 150° C. and 190° C. The EVOH melt flow index will generally be about 0.5 to 30 g/10 min. at 210° C. using a 2160 g weight.

The "Anhydride modified polyolefin" is intended to mean polyolefin polymer having carboxylic acid anhydride functionality. The most preferred modified polyolefin polymers are ethylene polymers derived from:
(a) about 40 to about 79 wt % ethylene comonomer,
(b) about 0.5 to about 30 wt % carbon monoxide or sulfur dioxide,
(c) about 20 to about 50 wt % unsaturated carboxylic acids or unsaturated derivatives of carboxylic acids other than anhydrides, and
(d) about 0.1 to about 5 wt % of at least one comonomer containing pendant carboxylic acid anhydride functionality.

Component (c) is preferably an alkyl acrylate or methacrylate, in particular n-butyl acrylate. The comonomer preferably comprises about about 28 to about 30 wt % of the copolymer's main chain.

Component (d) is at least one comonomer containing pendant carboxylic acid anhydride functionality. The grafting monomer is preferably maleic anhydride.

The grafting method of the anhydride comonomer can be any conventional process known in the art. For example, grafting accomplished in the melt without a solvent, or in a solution or dispersion. Melt grafting can be done using a heated extruder, a Brabender or Banbury mixer or other internal mixers or kneading machines, roll mills, and the like. The grafting may be carried out in the presence of a radical initiator such as a suitable organic peroxide, organic perester, or organic hydroperoxide or by heat alone.

The graft polymers can be recovered by any method which separates or utilizes the graft polymer that is formed. Thus the graft polymer can be recovered in the form of precipitated fluff, pellets, powders, and the like.

The amount of monomer grafted onto the ethylene copolymer is not particularly limiting, and may be as low as about 0.01 wt % or as much as about 5 percent, based on the weight of the grafted ethylene copolymer. Preferably the amount of graft comonomer is 0.05 to about 1.0 or 1.5 percent of the polyolefin, and more preferably about 0.1 to about 0.5 percent.

The anhydride-modified copolymer presumably reacts and bonds to the EVOH, thereby providing compatibalization between the polyolefin and the EVOH, which in turn, provides toughness to the final composition. Generally, this result can be achieved with the presence of about 10–25 weight parts modified-polyolefin based upon 100 weight parts EVOH and anhydride-modified polyolefin.

When incorporating the anhydride-modified polyolefin into the EVOH, the associated side reactions would cause melt viscosity instability. To prevent such viscosity instability, a basic inorganic compound, preferably a metal oxide and/or salt is also incorporated into the melt blend in an effective amount to counteract the viscosity instability reaction(s). Examples of suitable such compounds include CaO, $CaCO_3$, MgO, $MgCO_3$, ZnO and $ZnCO_3$ and mixtures thereof. Carbonates are most preferred.

The hindered phenolic antioxidant can be one or more of a well known class of antioxidants generally used to combat oxidative degradation during thermal processing of the EVOH. Such antioxidants are characterized by a phenol group with sterically bulky substituents located ortho to the OH functionality. Such antioxidants are well-known and are sold under a variety of trade names. Suitable antioxidants include 4,4'-thio-bis(6-t-butyl-m-cresol), 1,3,5-trimethyl-2,4,6-tris(3,5-t-butyl-5-hydroxybenzyl)benzene, tetrakis(methylene(3,5-di-t-butyl-4-hydroxyhydrocinnamate) methane, octadecyl-3,5-di-t-butyl-4-hydroxyhydrocinnamate, N,N'-hexamethylene-bis(3,5-di-t-butyl-4-hydroxyhydrocinnam-amide), N,N'-trimethylene-bis(3,5-di-t-butyl-4-hydroxyhydro-cinnamamide), and hexamethylene-bis(6-t-butyl-m-cresol).

The amount of hindered phenolic antioxidant will generally be about 0.01 to about 0.5 wt %, preferably about 0.04 to about 0.4 wt %, based on the total amount of EVOH and anhydride-modified polyolefin present.

Another important stabilizer is a metal salt of an aliphatic carboxylic acid having 3 to 9 carbon atoms ("C3–C9 STABILIZER"). This stabilizer is used to combat EVOH thermal degradation during thermal processing. Preferably, the metal is monovalent or divalent. Calcium, magnesium, and zinc are preferred, and calcium is particularly preferred.

C3–C9 STABILIZERS are preferably saturated, unsubstituted monocarboxylic acids and include propionic acid, n-butyric acid, isobutyric acid, n-pentanoic acid, n-hexanoic acid, n-heptanoic acid, n-octanoic acid, 2-ethylhexanoic acid, n-nonanoic acid, and isomers thereof.

The amount of the above-described salt will generally be about 0.005 to about 0.5 weight parts per hundred weight parts EVOH and anhydride-modified polyolefin. The preferred amount will depend to some extent on the identity and molecular weight of the acid component of the salt.

The amount of the hindered phenol antioxidant and metal salt as described above should in any event be present in an effective amount to stabilize the EVOH against oxidative and thermal degradation, respectively, under the conditions of melt processing employed. Such degradation, if it occurred, would cause the viscosity of the EVOH to increase during melt processing, leading to gelation of the EVOH. In effect, therefore the antioxidant and metal salt additives provide viscosity stabilization to the molten EVOH. Excessive amount of either additive can cause degradation of the EVOH, manifested by decreasing melt viscosity.

A salt of a higher fatty acid can also be present to supplement the above-described stabilizer combination. The higher fatty acid can be any of those having about 14 to about 22 carbon atoms, and the neutralizing metal ion can be any of those listed above. The amount of such salt is preferably 0.05 to 0.5 wt parts per hundred weight parts EVOH and anhydride-modified polyolefin. In particular, a small amount of a stearate (particularly calcium stearate) can provide enhanced results. The higher fatty acid salt is in addition to the C3–C9 STABILIZER, which is essential to the composition, and the higher fatty acid salt is NOT a substitute for the C3–C9 STABILIZER.

Additional additives, fillers, and the like can be added for their ordinary functions, so long as they do not interfere with the functioning of the present invention. Such additives can include glass fiber or microspheres, talc, clay, mica, lubricants (e.g. ethylene bis-stearamide, polyethylene waxes, ionomer waxes) and pigments. Other polymers may also be added to the melt blend to impart their properties to the melt fabricated product.

Preferably, all of the basic inorganic compound is incorporated into the melt blend by pre-incorporation into the anhydride-modified polyolefin. The pre-blended, modified-polyolefin and basic inorganic compound is finely dispersed and melt blended into the EVOH, by stirring, agitation, mixing, or the like. The interface (between the molten anhydride-modified polyolefin and the molten EVOH) and the adjacent regions are stabilized by the basicity of the basic inorganic compound, thereby counteracting gelation; otherwise, the undesirable side reactions between anhydride groups and OH groups can create unwanted crosslinking or gelation. The basic inorganic compound is efficiently made available at the interface as the anhydride-modified polyolefin is divided into smaller and smaller molten particles by the mixing action applied to the melt blend. In this way, the basic inorganic compound is slowly released into the EVOH molten matrix in the precise region where the gelation is prone to occur, thereby counteracting gelation during the entire duration of melt blending.

This counteraction (viscosity stabilization) is also present when molding granules of the melt blend from melt compounding is re-melted in the course of melt fabrication, such as by injection molding or extrusion. Alternatively, the melt compounding and melt-fabrication can be carried out in a single thermal processing operation, with the basic inorganic compound counteracting the formation of any appreciable gelation. The metering of the basic inorganic compound into the EVOH via the surface of the dispersed phase of anhydride-modified polyolefin in the EVOH also tends to protect the EVOH from being degraded excessively by the compound during the time of thermal processing required.

The compositions of the present invention are useful in providing tough oxygen and/or flavor barrier layers in coextruded plastic structures, e.g., multilayer sheets and thermoformed containers therefrom, multilayer films, pipes, tubes, and blow-molded articles, and in multilayer structures formed by injection molding, colamination, or by extrusion coating.

The preferred embodiment and best mode are further exemplified by the following Examples.

TABLE I

|  | 1A | 1B | 2 | 3 | 4 | 5 | 6 | 7 | 8 |
|---|---|---|---|---|---|---|---|---|---|
| EVOH, g | 184 | 184 | 84.68 | 192 | 192 | 192 | 192 | 184 | 184 |
| antioxidant, g | 1.84 | 1.84 | 0.2 | 0.48 | 0.48 | 0.48 | 0.48 | — | 0.46 |
| Stabilizer, g |  |  |  |  |  |  |  |  |  |
| C-17 stabilizer | 0.23 | 0.23 | 0.05 | 0.24 | 0.24 | 0.60 | 0.60 | — | 0.23 |
| C-8 stabilizer | 0.46 | 0.46 | 0.13 | 0.36 | 0.36 | — | — | — | 0.35 |
| Second resin, g |  |  |  |  |  |  |  |  |  |
| LLDPE-gMA | 46 | 46 | — | — | — | — | — | — | — |
| PP-gMA | — | — | 14.94 | — | — | — | — | — | — |
| E/BA/CO-gMA | — | — | — | 48 | — | — | — | 46 | 46 |
| PP | — | — | — | — | 48 | 48 | — | — | — |
| E/EA Copolymer | — | — | — | — | — | — | 48 | — | — |
| Basic inorganic compound, g |  |  |  |  |  |  |  |  |  |
| MgCO$_3$ | — | — | — | 1.44 | 1.44 | — | — | — | — |
| CaCO$_3$ | 1.84 | — | 4.5 | 1.44 | 1.44 | — | — | — | — |
| MgO | — | — | — | — | — | 1.44 | 1.44 | — | — |
| CaO | — | — | — | — | — | 1.44 | 1.44 | — | — |

EXAMPLES

Experiments were conducted using the following materials:

EVOH: a copolymer of 13.29 wt % (32 mole percent) ethylene and 86.71 wt % vinyl acetate which was 99 percent saponified to vinyl alcohol groups and having a melt flow index of 3.2 g/10 at 210° C. using 2160 g weight in pellet form.

LLDPE-gMA: a pelletized linear low density polyethylene (LLDPE) terpolymer of 87.1 wt % ethylene, 5.7 wt % of butene and 6.4 wt % of octene and having a melt flow index of 9.6 g/10 min at 190° C. and anhydride-modified by grafting 0.23 wt % of maleic anhydride to the LLDPE.

PP-gMA: pelletized polypropylene having a melt flow of 30 g/10 min at 230° C. using a 2160 g weight, and having 0.1 wt % succinic anhydride groups produced by graft reaction between polypropylene and maleic anhydride.

E/BA/CO-gMA: a pelletized 58 wt % ethylene/28 wt % n-butyl acrylate/14 wt % carbon monoxide terpolymer grafted with 0.25 wt % maleic anhydride.

PP: polypropylene homopolymer pellets.

E/EA Copolymer: =65% ethylene/35% ethyl acrylate copolymer in pellet form.

Antioxidant: ETHANOX 330, a hindered phenolic antioxidant of Ethyl Corp. believed to have the approximate formula: 1,3,5-trimethyl-2,4,6-tris(3,5-di-tert-butyl-4-hydroxybenzyl) benzene.

EXAMPLE 1

A polymer blend (A) was prepared in a Haake mixer equipped with a high shear intensity, roller-blade rotor. Calcium carbonate and LLDPE-gMA were placed in the mixer and blended at 230° C. for several minutes with rotor speed at 15 rev./min. EVOH, calcium octanoate (sometimes hereinafter "C-8") and calcium stearate (sometimes hereinafter "C-17") stabilizers and antioxidant were added and mixing was continued until total elapsed mixing time had reached 5 minutes. The rotor speed was raised to, and held at, 50 rev./min for 60 min. The mixer was controlled to maintain blend temperature at 230° C. Compositions of the Examples are shown in Table I.

TABLE II

| Torque (m.g) | 1A | 1B |
|---|---|---|
| at 15 min of mixing | 3306 | 3097 |
| at 30 min of mixing | 3379 | 3922 |
| at 45 min of mixing | 2982 | 4235 |
| at 60 min of mixing | 2308 | 4538 |

TABLE III

| Mixing Time | Torque (m.g) |
|---|---|
| 15 min | 2552 |
| 30 min | 2508 |
| 45 min | 2128 |
| 60 min | 1751 |

A comparative blend (B) was prepared similarly except that calcium carbonate was not included.

The torque necessary to operate the mixer rotor and blend temperature were monitored. In these examples, mixing torque is interpreted as being a measure of melt viscosity hence changing torque is an indication of melt viscosity variation. Torque measurements at 15, 30, 45 and 60 minutes after raising rotor speed are shown in Table II.

Table II

These results show a relatively constant melt viscosity for experiment (A) for at least the first 30 minutes, followed by some viscosity reduction after that time. The peak torque was 3379 meter-grams (m-g) occurring at 30 min. Experiment (B) in which no CaCO3 was present exhibited an increasing melt viscosity with mixing time, with the maximum torque being 4564 m-g occurring at 58 min. of mixing time, indicating a progressively increasing amount of crosslinking. At 60 minutes mixing time, the melt blend of experiment (A) exhibited a melt flow index of 6.37 g/10 min. at 230° C., and the melt blend of experiment (B) exhibited no flow, i.e., it had gelled.

EXAMPLE 2

PP-gMA and calcium carbonate were precompounded in a twin-screw extruder to produce uniform composition pellets. These pellets were fed to a Buss Kneader continuous mixer together with remaining components to provide pellets having the composition shown in Table I. The latter pellets were placed in the Haake mixer and subjected to the melting and torque measurement process of Example 1. Results are shown in Table III.

Table III

The peak torque was 2508 m-g occurring at 36 min. mixing time and the melt flow of the melt blend was 7.68 g/10 min. at 230° C. after 60 min. of mixing. As in the case of experiment (A) of Example 1, melt viscosity remains fairly constant for a considerable period of time, followed by some viscosity reduction.

The period of time of fairly constant melt viscosity is more than enough time for melt processing, such as by film extrusion, for melt fabrication without appreciable crosslinking and gelation occurring. For the small amount of polymer that may build up on the extrusion die or within the melt fabrication equipment to have a longer melt residence time, the reduced melt viscosity thereof enables the fabricated article to better be able to purge the apparatus of such polymer and incorporate it in the article without deleterious effect. In contrast, when such polymer greatly increases in melt viscosity, its incorporation into the melt fabricated article creates visual defects, typically appearing as "fish eyes" when the article is a film.

EXAMPLE 3 AND EXAMPLE 4 (COMPARATIVE)

The procedure of Example 1A was repeated except that E/BA/CO-gMA was used as the second resin and that the basic inorganic compound was the combination of magnesium carbonate and calcium carbonate.

Example 4 is comparative. The second resin was olypropylene homopolymer, a non-anhydride-modified polyolefin. EVOH and polypropylene were charged to the mixer simultaneously and the other ingredients were charged during the 5 minute pre-mix period after the polymer pellets had melted.

Mixing torque versus time is shown in FIG. 1. The vertical dashed line indicates the time at which the mixer rotor speed was raised. All of the curves exhibit a drop in torque from immediately after raising rotor speed until from about 10 to 15 minutes of high speed mixing. This is believed to occur because the step change of rotor speed raised the blend temperature which accordingly lowered material viscosity. Thus, the torque of the initial 10–15 minute period of high speed mixing is deemed not representative of the stability or instability of the melt viscosity.

Curve A shows the torque vs. time of Example 3. After the above-described initial drop of torque, the torque of Curve A remains constant for 60 minutes demonstrating that compositions according to the present invention provide stable melt viscosity. Curve B is the data for comparative Example 4. Again, the torque initially drops then holds steady for up to about 32 min of high speed mix time (37 min point on FIG. 1). Thereafter, torque drops steadily from about 1400 m-g to less than 200 m-g indicating melt viscosity instability.

EXAMPLES 5–8 (COMPARATIVE)

The procedure of Example 4 was repeated and in each example at least one critical component of the present invention was excluded from the composition. In Example 5, no C3–C9 stabilizer was used and the second resin was PP. Additionally, the basic inorganic compound was the combination of magnesium oxide and calcium oxide. Example 6 was the same as Example 5 except that the second resin was E/EA copolymer. The unstabilized composition of EVOH and E/BA/CO-gMA was used in Example 7. In Example 8, no basic inorganic compound was present.

Mixing torque versus time is shown in FIG. 1 with data of comparative Examples 5–8 shown as curves C, D, E and F, respectively. Curves C and D each immediately drop but then continue to fall to essentially zero torque after less than 15 minutes of high speed mixing. During these experiments, severe foaming of the melt-blend was observed, and this indicates a near-complete breakdown of the blend to render it useless. Curve E was a composition of EVOH and E/BA/CO-gMA without any stabilization. After the initial torque drop, the torque curve starts to rise and continues upward. This is viewed as indicating the occurrence of gelation which caused the viscosity of the blend to increase uncontrollably. Curve F contains antioxidant and C-8 and C-17 stabilizers but does not contain a basic inorganic compound. The viscosity increase was not as steep as in curve E however, because the torque continued to rise substantially, and therefore the blend did not exhibit melt viscosity stability.

I claim:

1. A process for making a melt stable composition comprising:
   a) from about 51 to about 99 weight parts of an ethylene vinyl alcohol copolymer ("EVOH");
   b) from about 1 to about 49 weight parts of an anhydride-modified polyolefin;
   c) from about 0.01 to about 0.5 weight parts of a hindered phenolic antioxidant;
   d) from about 0.005 to about 0.5 weight parts of a metal salt of an aliphatic carboxylic acid having 3 to 9 carbon atoms; and
   e) from about 0.05 to about 5 weight parts of a basic inorganic compound selected from the group consisting of metal oxide, metal salt and combinations thereof;

wherein the weight parts of c), d) and e) are per 100 weight parts a) and b), said method comprising the steps of:
   I) melt-blending b) and e); and
   II) melt-blending the compositions of I) with a), c) and d).

* * * * *